United States Patent [19]

Murakami

[11] Patent Number: 4,914,338
[45] Date of Patent: Apr. 3, 1990

[54] VIBRATION WAVE MOTOR

[75] Inventor: Shuji Murakami, Machida, Japan

[73] Assignee: Canon Kabushiki Kaisha, Tokyo, Japan

[21] Appl. No.: 395,215

[22] Filed: Aug. 17, 1989

Related U.S. Application Data

[63] Continuation of Ser. No. 132,184, Dec. 14, 1987, abandoned.

[30] Foreign Application Priority Data

Dec. 17, 1986 [JP] Japan ............................ 61-300694

[51] Int. Cl.⁴ .............................................. H01L 41/08
[52] U.S. Cl. ............................................. 310/323
[58] Field of Search ............................. 310/323, 328

[56] References Cited

U.S. PATENT DOCUMENTS

| | | | |
|---|---|---|---|
| 4,019,073 | 4/1977 | Vishnevsky et al. | 310/323 |
| 4,513,219 | 4/1985 | Katsuma et al. | 310/328 |
| 4,562,373 | 12/1985 | Tokusima et al. | 310/328 |
| 4,578,115 | 3/1986 | Harrington et al. | 75/255 |
| 4,613,782 | 9/1986 | Mori et al. | 310/328 X |
| 4,779,018 | 10/1988 | Okuno et al. | 310/323 |

FOREIGN PATENT DOCUMENTS 1066345 11/1979 Canada ............................ 310/328

Primary Examiner—Mark O. Budd
Attorney, Agent, or Firm—Fitzpatrick, Cella, Harper & Scinto

[57] ABSTRACT

A vibration wave motor for frictionally driving a movable member contacting, under pressure, a vibration member, by a vibration wave generated in the vibration member, includes at least a contact area of the movable member which is to contact to the vibration member and has an alumite film thereon irradiated with a high energy density beam.

6 Claims, 1 Drawing Sheet

VIBRATION WAVE MOTOR

This application is a continuation of application Ser. No. 132,184 filed 12/14/87, now abandoned.

BACKGROUND OF THE INVENTION

1. Field of the Invention

The present invention relates to a vibration wave motor constructed to frictionally drive a movable member contacting to a vibration member by generating a vibration wave in the vibration member by an electromechanical energy converting vibration element (for example, piezoelectric element or electrostrictive element), and more particularly to technology for improving wear resistance of the movable member.

2. Related Background Art

A vibration wave motor has been disclosed by many prior art publications (for example, Japanese Laid-Open Patent Application No. 29192/1977, U.S. Pat. No. 4,580,073 and U.S. Pat. No. 4,587,452). Since the vibration wave motor is essentially driven by frictional drive, the drive force of the vibration wave motor largely depends on the product MW, where W is the pressure force to press the movable member into contact with the vibration member and M is the coefficient of friction. Thus, the vibration member and the movable member are required to be made of a combination of materials having large coefficients of friction M and also to be of low wear. A combination of materials which meets such a requirement is a movable member comprising pure aluminum or an aluminum alloy coated with hard alumite film and a vibration member comprising brass coated by flame spraying a film mixture of tungsten carbide and cobalt (WC-Co 12%) (U.S. patent application Serial No. 921010 filed Oct. 21, 1986).

However, such a combination still has the disadvantage that wear of the alumite film is large.

SUMMARY OF THE INVENTION

It is an object of the present invention to improve the wear resistance of an alumite film of a slide portion (contact area with a vibration member) of a movable member to improve durability of a vibration wave motor.

Other objects of the present invention will be apparent from the following description of the invention.

In order to achieve the above object, in accordance with the present invention, in a vibration wave motor which frictionally drives the movable member contacting, under pressure, the vibration member by the vibration wave generated in the vibration member, an alumite film having a high energy density beam irradiated thereto is applied to at least a contact area of the movable member which is to contact the vibration member.

DETAILED DESCRIPTION OF THE PREFERRED EMBODIMENTS

Figure 1A:
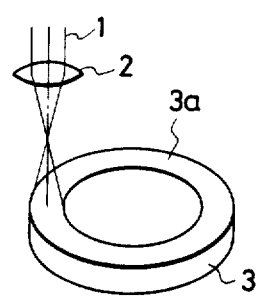
FIG. 1A shows a perspective view illustrating laser irradiation to a movable member having an alumite film formed thereon.
Figure 1B:
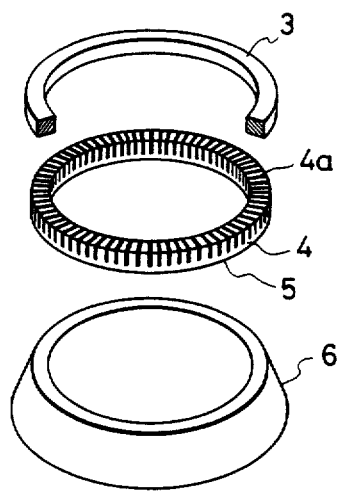
FIG. 1B shows a vibration member and the movable member.

An embodiment in which the present invention is applied to a vibration wave motor which utilizes a travelling vibration wave by using a ring-shaped movable member and a vibration member is now explained. FIG. 1A shows a movable member. The movable member 3 comprises aluminum alloy A6061, and an alumite film is formed by sulfuric acid-alumite treatment on at least a contact surface 3a (top surface in FIG. 1A) which is adapted contact to a contact surface 4a of a vibration member 4 (FIG. 1B). The alumite film is irradiated high energy density laser beam.

The high energy density laser beam irradiation is effected by irradiating the contact (slide) surface 3a of a movable member 3 through a laser collecting lens 2 with a $CO_2$ laser beam which is a high energy density beam. A predetermined laser irradiation energy density is attained by adjusting the distance between the slide surface 3a of the movable member 3 and the lens 2, and the laser beam is moved around the circumference of the movable member 3 to complete the irradiation. The energy density of the laser irradiation may be $10^3$–$10^5$ w/cm², and the irradiation speed may be 1–10 cm/sec although it may change depending on the energy density of the laser beam and the alumite film thickness.

The hardness of the alumite film before the laser irradiation was Hv 450–500 and the hardness after the laser irradiation was increased to Hv 750–800.

Figure 3:
FIGS. 3 and 4 show graphs of X-ray diffraction measurement of the alumite film before and after the laser irradiation.
Figure 4:
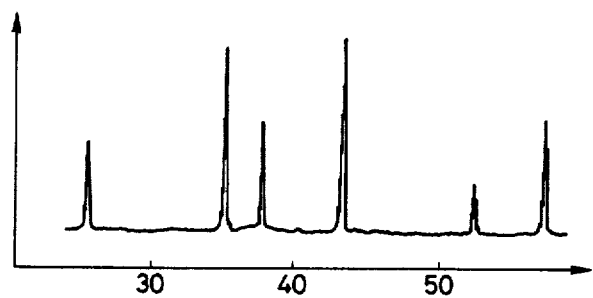

Structures of the alumite films before and after the irradiation were examined by X-ray diffraction. Before the irradiation, no crystalline state existed as shown in FIG. 3, and after the irradiation, α-alumina crystal appeared as shown in FIG. 4. In FIGS. 3 and 4, abscissas represent X-ray diffraction angles and ordinates represent intensities (relative values) of diffracted X-rays.

Figure 2:
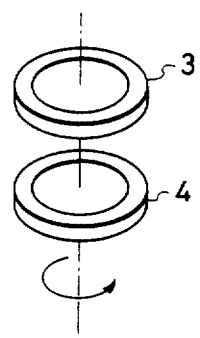
FIG. 2 shows a perspective view of the movable member and the vibration member in a wear resistance test.

Friction tests with the vibration member were conducted for the movable members having the alumite films irradiated by the laser beam and not irradiated by the laser beam. As shown in FIG. 2 the movable member 3 contacts the vibration member 4 (which is similar to the vibration member shown in FIG. 1B although details thereof are not shown for the sake of simplicity) with a pressure of 2.75 kg, and they were rotated relative to each other and slid at a rotation speed of 350 r.p.m. for 30 minutes. The wear of the movable member was measured. The movable member 3 and the vibration member 4 are rings having a mean radius of 22 mm. Formed on the slide area of the vibration member 4 comprising invar alloy is a WC-Co 12% flame sprayed film. The movable member 3 is a ring comprising aluminum alloy A6061 having the alumite film formed thereof by the sulfuric acid-alumite treatment, with or without the slide surface (the bottom surface in FIG. 2) being irradiated with the laser beam. The test result is shown in Table 1.

TABLE 1

| | Surface Treatment | |
|---|---|---|
| Item | Sulfuric Acid-Alumite | Sulfuric Acid-Alumite + Laser Irradiation |
| Alumite Film Thickness (μm) | 30 | 31 |
| No. of Samples | 5 | 7 |
| Wear Max (mg) | 2.8 | 1.7 |
| Min | 1.0 | 0 |

TABLE 1-continued

| | Surface Treatment | |
|---|---|---|
| Item | Sulfuric Acid-Alumite | Sulfuric Acid-Alumite + Laser Irradiation |
| Ave | 2.0 | 0.6 |

As is apparent from Table 1, the movable member 3 irradiated with the laser beam exhibits a wear resistance approximately three times as high as that of the movable member 3 not irradiated with the laser beam.

While the $CO_2$ laser was used as the source of the high energy density beam, a similar effect may be attained when other laser beams (for example, YAG laser) or electron beam are used.

The material of the movable member 3 may be an aluminum alloy other than the 6000 series. The film to be irradiated by the high energy density beam may be an alumite film formed by alumite treatment other than the sulfuric acid-alumite treatment.

The above embodiment relates to a rotary vibration wave motor which comprises means 5 (FIG. 1B) for generating a travelling vibration wave in the vibration member 4 (FIG. 1B), ring-shaped vibration member 4, ring-shaped movable member 3 and member 6 which contacts, under pressure, the movable member 3 to the vibration member 4, however; a similar effect is attained when the present invention is applied to a linear-driven vibration wave motor. Further, a similar effect may be attained when the present invention is applied to a motor which drives a movable member by vibration of a twist vibration member instead of the vibration wave motor of the embodiment which drives the movable member by the travelling vibration wave motor.

In accordance with the present invention, the durability of the vibration wave motor is significantly enhanced by improving the wear resistance of the movable member.

I claim:

1. A vibration wave motor comprising:
   a vibration member; and
   a movable member contacting under pressure said vibration member by a vibration wave generated in said vibration member, wherein said movable member comprises a contact area adapted to contact said vibration member, wherein at least said contact area has a $CO_2$ laser irradiated alumite film thereon having a hardness in the range of approximately Hv 750–800,
   wherein said vibration member comprises a contact area adapted to contact said contact area of said movable member and comprising a WC-Co 12% flame sprayed film.

2. A vibration wave motor according to claim 1, wherein said alumite film is a film treated by sulfuric acid-alumite treatment.

3. A vibration wave motor according to claim 1, wherein said movable member is made of a 6000 series aluminum alloy.

4. A motor comprising:
   a vibration member; and
   a movable member contacting under pressure said vibration member by vibration generated in said vibration member, wherein said movable member comprises a contact area adapted to contact said vibration member, wherein at least said contact area has a $CO_2$ laser irradiated alumite film thereon having a hardness in the range of approximately Hv 750–800,
   wherein said vibration member comprises a contact area adapted to contact said contact area of said movable member comprising a WC-Co 12% flame sprayed film.

5. A motor according to claim 4, wherein said alumite film is a film treated by sulfuric acid-alumite treatment.

6. A motor according to claim 4, wherein said movable member is made of a 6000 series aluminum alloy.

* * * * *